United States Patent [19]
Shulman et al.

[11] Patent Number: 4,656,198
[45] Date of Patent: Apr. 7, 1987

[54] POLYIMIDE FOAMS AND METHODS OF MAKING SAME

[75] Inventors: Garson P. Shulman, Torrance; Chris C. L. Fung, Valencia, both of Calif.

[73] Assignee: RMB Products, Simi Valley, Calif.

[21] Appl. No.: 882,538

[22] Filed: Jul. 7, 1986

Related U.S. Application Data

[62] Division of Ser. No. 819,712, Jan. 16, 1986.

[51] Int. Cl.$^4$ .............................. C08J 9/22; C08J 9/24
[52] U.S. Cl. ........................................ 521/56; 264/53; 521/60; 521/184; 521/185; 521/189; 521/58
[58] Field of Search ....................... 264/53; 521/56, 58, 521/60, 184, 185, 189; 528/329, 331

[56] References Cited

U.S. PATENT DOCUMENTS

| | | |
|---|---|---|
| 4,439,381 | 3/1984 | Gagliami et al. ................ 521/185 |
| 4,476,254 | 10/1984 | Long et al. ..................... 521/185 |
| 4,518,717 | 5/1985 | Long et al. ..................... 521/185 |
| 4,539,336 | 9/1985 | Long et al. ..................... 521/185 |
| 4,546,115 | 10/1985 | Gagliani et al. ................. 521/185 |
| 4,562,112 | 12/1985 | Lee et al. ....................... 521/185 |

Primary Examiner—Morton Foelak
Attorney, Agent, or Firm—Spensley Horn Jubas & Lubitz

[57] ABSTRACT

A high temperature, flame resistant polyimide foam material and methods of making open and closed cell, rigid and flexible foams from common precursors. An aromatic tetracarboxylic dianhydride is reacted with an amino acid and an alcohol or mixture of alcohols to produce an N-substituted imido acid ester. The product is then reacted with an aromatic diamine. The resulting liquid is dried, ground to a course powder, ad classified into sizes from 0.25 mm to 2 mm by sieving. The powder is suitable for foaming without further modificaiton, by exapansion at 100 to 3000 in a closed mold to form a well consolidated, uniform, mostly closed cell product. When expanded unrestrictedly, open cell flexible or rigid consolidated foams are produced, depending on choice of alcohol(s). The foams have excellent resistance to heat and flame, and bond well to glass prepreg to form rigid structures.

1 Claim, No Drawings

POLYIMIDE FOAMS AND METHODS OF MAKING SAME

This is a division of application Ser. No. 819,712, filed on Jan. 16, 1986.

BACKGROUND OF THE INVENTION

This invention relates in general to polyimide foams and more specifically, to making rigid, flame resistant foamed structures from simple precursors with minimal processing.

Polyimides have been important commercial polymers for approximately 20 years, but until recently, have not been readily fabricated as foams. Gagliani et al, in U.S. Pat. No. 4,305,796, 4,407,980, and 4,425,441, among others, describe the preparation of resilient foams and structures formed from them, as well as methods of preparing and curing them. Many of the procedures require binary or ternary mixtures of amines, use of microwave or pulsed microwave heating, with or without preheating, postcures, and a 7 step procedure for preparing a foam from a dianhydride, an oxoimine, an alcohol, a surfactant, and an aromatic diamine, with drying, grinding, vacuum drying, and expanding to form a flexible foam (U.S. Pat. No. 4,425,441).

Suitable foams are only produced from relatively large particles (0.5 to 10 mm), preferably 1 to 5 diameter. There is a need for a material to be used for forming thin structures, such as resilient tiles or rigid glass cloth covered wall panels less than 5 mm in thickness. Large particles will not even fit in such a mold, let alone produce a uniform, closed cell structure.

For production of rigid molded structures (2 to 5 lbs/cubic foot), no comparable procedure is known. Also, there is a need for reduction in process complexity to allow for more economical production.

SUMMARY OF THE INVENTION

The problem of producing a rigid foam has been overcome by using amino acids in place of oxoimines to produce N-substituted imides having only one or two methylene groups between nitrogen and carboxyl. While we are not certain, we believe that residual caprolactam or other oxoimine is left in the final foam, or re-forms during the curing process, and serves as a plasticizer making the polyimide resilient. Glycine, beta-alanine, and analogous amino acids are unable to form comparable oxoimines; hence, cannot plasticize the foam.

Processing has been simplified by mixing all ingredients but the aromatic diamine, refluxing to form the imidoester, taking advantage of high reactivity of aliphatic amines as compared to cyclic oxoimines. A single drying step suffices, since suitable foams are produced using residual esterified alcohol as the blowing agent. Indeed, a resilient structure 3 mm thick can be produced from 50-60 mesh (0.25-0,30 mm) powder, while 20-30 mesh (0.59-0.84 mm) granules are best for forming thicker structures. The finer powders or granules can be more uniformly distributed, and can be expanded in a simple oven as easily as by microwaving, thus allowing use of metallic molds.

Control of resiliency or rigidity is achieved by adding a non-volatile alcohol, such as a glycol monoether during esterification or before foaming. In addition to plasticizing the final foam, it modifies the foaming process to form larger cells, an outer skin, etc.

DETAILED DESCRIPTION OF THE INVENTION

Either a consolidated, uniform, closed cell, shaped foam product or a muffin or loaf-like open cell sponge may be produced, depending on whether foaming is restrained or unrestrained. If methoxyethanol (ethylene glycol monomethyl ether) is used in small amounts (0.01 to 0.5%), along with a large excess of low-boiling alcohol, coherent, resilient foams are obtained. Addition of 1 to 5% of glycol ethers results in a very rigid, hard foam with non-uniform cell size and an outer skin. In the absence of glycol ether, smaller particle sizes form a higher density foam (5 to 10 lbs/cubic ft) while particle sizes of 0.59 to 0.84 mm form a good low density (1.2 to 5 lbs/cubic ft) foam when expanded unrestrained.

Generally, the glycol ether treated foam expands to a density of 1.2 to 2.5 lbs/cubic ft unrestrained if the residual esterified alcohol content is 10 to 20% by weight. In a mold, densities of 2.5 to 30 lbs/cubic ft. of closed cell foam can be achieved. Gagliani (U.S. Pat. No. 4,425,441) reports satisfactory results only with 25 to 50 fold expansion, and failure to form uniform closed cell foam with less than 25 fold expansion in a closed mold, forming essentially the same polymer from different precursors, but the precursors we prepare permit operation with 2 to 50 fold expansion.

The critical factor in achieving good foams with high expansion is the amount of residual esterified alcohol. If the residual is less than 10%, insufficient expansion results, while if it is too high, above 20%, large bubbles form in the foam. A level around 12% is best for high density foams, around 15% for low density foams.

Any suitable aromatic dianhydride can be used in the preparation of the desired imides. Typical examples are described and listed in U.S. Pat. Nos. 4,355,120, 4,360,604, and 4,361,453. Due to their ready availability, low cost, and the excellent foams which result, pyromellitic dianhydride and 3,3',4,4'-benzophenonetetracarboxylic dianhydride are recommended by Gagliani (U.S. Pat. No. 4,425,441) and are equally suited to our procedure.

We have found that the alcohol present in major proportion should have a boiling point from 75 to 100 C., but that small amounts of higher boiling alcohol are not necessarily deleterious, and may actually enhance processability and final properties of the polymer, since they remain through the drying and foaming stages.

Any alpha or beta amino acid may be reacted with the dianhydride, provided that a hydrogen atom is attached to the nitrogen. Preferably, it has the following formula:

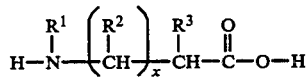

where X is 0 or 1 and R, R, and R may be hydrogen, alkyl, aryl, or heterocyclic hydrocarbon radicals. Of these, the best results are obtained with glycine and beta-alanine. Alcohols used may be ethyl, isopropyl, propyl in major amounts, or higher aliphatic alcohols or glycol monoethers such as methoxyethanol, ethoxyethanol, or diethylene glycol monomethyl ether in minor amounts.

Any suitable diamine may be used. Typical diamines include meta-phenylene diamine, para-phenylene diamine, 4,4'-diaminodiphenyl ether, 4,4'-diaminodiphenyl sulfone, 4,4'-diaminodiphenylmethane, and mixture thereof. The preferred amine is 4,4'-diaminodiphenylmethane (methylenedianiline), which gives best results. Aliphatic diamines may be used, but the resulting product will be more resilient than desired in molded structures.

While any suitable reaction conditions may be used, best results are obtained by adding amino acid and alcohol to dianhydride, then stirring under reflux for 2 to 8 hours, depending on batch size, until a clear solution of imido acid ester is obtained. The mixture is cooled to 50 to 70 C., an amount of diamine stoichiometrically equivalent to anhydride is added, then stirring is continued until a clear solution is again obtained. The solution is then dried by any suitable method. Ordinarily, oven drying at 100 C. for 3 to 6 hours until residual esterified alcohol is 10 to 20% and the material is dry and tack-free is best. The solid is ground and separated into uniformly sized powders by sieving. This powder is suitable for foaming without further treatment. At this point, the compound is probably a mixed diimide of alanine and methylenedianiline. A mole ratio of 0.05:1 to 0.5:1 of amino acid to dianhydride is preferred. Above this level, amino acid solubility is too low for rapid reaction; at lower levels, there is insignificant imide formation. Optimum results occur at a ratio of 0.1:1 to 0.4:1. Diamine to anhydride ratios should be very close to 1:1. A 6 fold excess of alcohol promotes solution and keeps the mixture fluid until ready for drying. While not know for certain, analytical data is consistant with the following reaction scheme:

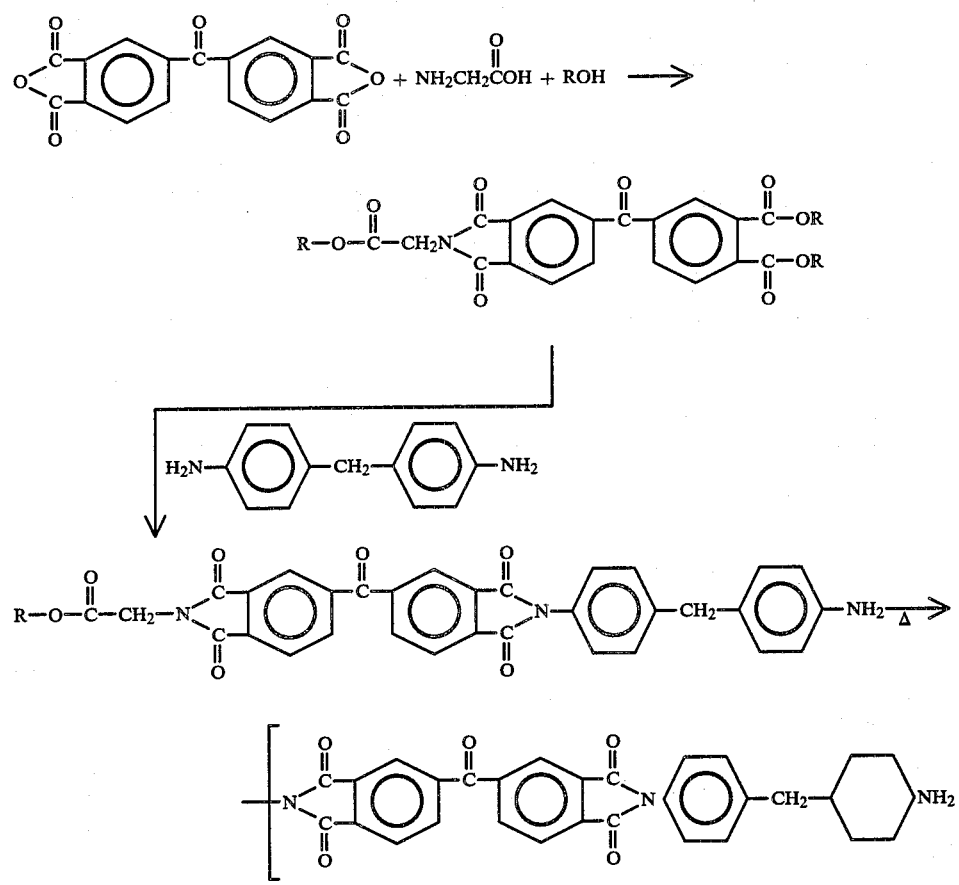

Details of the invention will be further understood upon reference to the following examples, which describe preferred embodiments of the methods and compositions of this invention. All parts and percentages are by weight, unless otherwise indicated.

EXAMPLE I

About 322 g. (1 mole) of 3,3',4,4'-benzophenonetetracarboxylic dianhydride (BTDA), 354 g. (6 moles) of isopropyl alcohol, and 22.5 g. of glycine are placed in a 1 liter three-neck flask fitted with a condenser. After 5 hours heating, the clear solution is cooled to 62 C., 198 g. of 4,4'-diaminodiphenylmethane is added, then stirring is continued for two hours, until a clear solution is again observed. The product is poured into a Teflon pan and dried at 90 C. for 3 hours. The solid residue is ground and sieved through a 16 mesh screen. Larger particles are ground further, to make maximum size 1.18 mm. Size ranges are 0.84 to 1.18 mm. (A), 0.59 to 0.84 (B), 0.42 to 0.59 (C), 0.30 to 0.42 (D), 0.25 to 0.30 (E), and less than 0.25 (F). A sample of each size was foamed unrestrained in a 450 F. oven, producing a slightly resilient muffin in each case, with visibly higher densities the smaller the particle size. Densities and Compression test data are tabulated below. An 88 g. sample of "D" was placed in a mold, which was closed and placed in a 450 F. oven for 2 hours then cooled. A 0.125×12×12 inch tile with a smooth surface was extracted from the mold.

EXAMPLE II

The procedure of example 1 was repeated, but using 26.8 g. of beta-alanine in place of glycine, heating for 5 hours, and cooling to 68 C. before adding methylenedianiline. The unrestrained foams were noticeably stronger. In addition to the tile, a 14×17×0.5 inch panel was molded between sheets of glass fiber prepreg, heating to 550 F. for 120 minutes and using 0.84 to 1.18 mm particles. The panel had a foam density of 3.5 lbs/cubic ft.

EXAMPLE III

The procedure of Example I was repeated, with 0.3 g. of 2-methoxyethanol also added to the original mixture. Residual Esterified Alcohol content was 14.5%. Panels of 3.5 lb/cubic foot density were prepared from "A" in molds. Sponges formed from "C" and "D" had densities of 0.02 g/cc and 0.03 g/cc, and absorbed 28 and 24 times their weight of water when compressed and released.

EXAMPLE IV

The procedure of Example I was repeated, with addition of 0.3 g of 2-methoxyethanol, and drying to 11% residual esterified alcohol. Tiles with a density of 15 lb/cubic ft were made from "C" and mixtures of "B" and "D" or "B" and "E". Tiles with a density of 30 lbs/cubic ft. were made from "E". A sample of 15 lb/cubic ft foam was immersed in water, and absorbed 4% of its weight of water, indicating a closed cell structure.

EXAMPLE V

The powder from Example III was blended as follows: 16 g. "A"; 4 g. "F", 1 g. 2-methoxyethanol. Unrestrained foaming in a 475 F. oven yielded an rigid closed cell foam, glassy in appearance, with a distinct skin. There were large voids where the skin hindered escape of alcohol vapors.

EXAMPLE VI

A mixture of 644 g. BTDA, 62 g. of 2-methoxyethanol, and 12 g. of isopropyl alcohol was heated under reflux. The mixture set up to a solid, which was crushed to a powder. A portion was mixed with an equivalent amount of methylenedianiline and heated in a 475 F. oven. A hard, rigid closed cell foam resulted. Cell size was variable, and included many large bubbles.

EXAMPLE VII

The procedure of example II was repeated, with drying to a 17.5% residual esterified alcohol content. Highly resilient foams with a density of 0.5 lbs/cubic foot, with no compression set were obtained by unrestrained foaming of 0.42 to 0.59 mm particles.

We claim:

1. The process of preparing high density (15 to 30 /b/cubic ft) foam panels by foaming 0.25 to 0.5 mm diameter particles of the composition produced by the reaction of 3,3',4,4'-benzophenonetetracarboxylic dianhydride, an amino acid selected from the group consisting of glycine or beta-alamine, 2-propanol, 4,4'-diaminodiphenyl methane in the presence a 2-methoxyethanol plasticizer alone, or mixed with the methylenedianiline monoimide dialkyl ester of benzophenonetetracarboxylic acid in a closed mold.

* * * * *